Figures 1, 2:
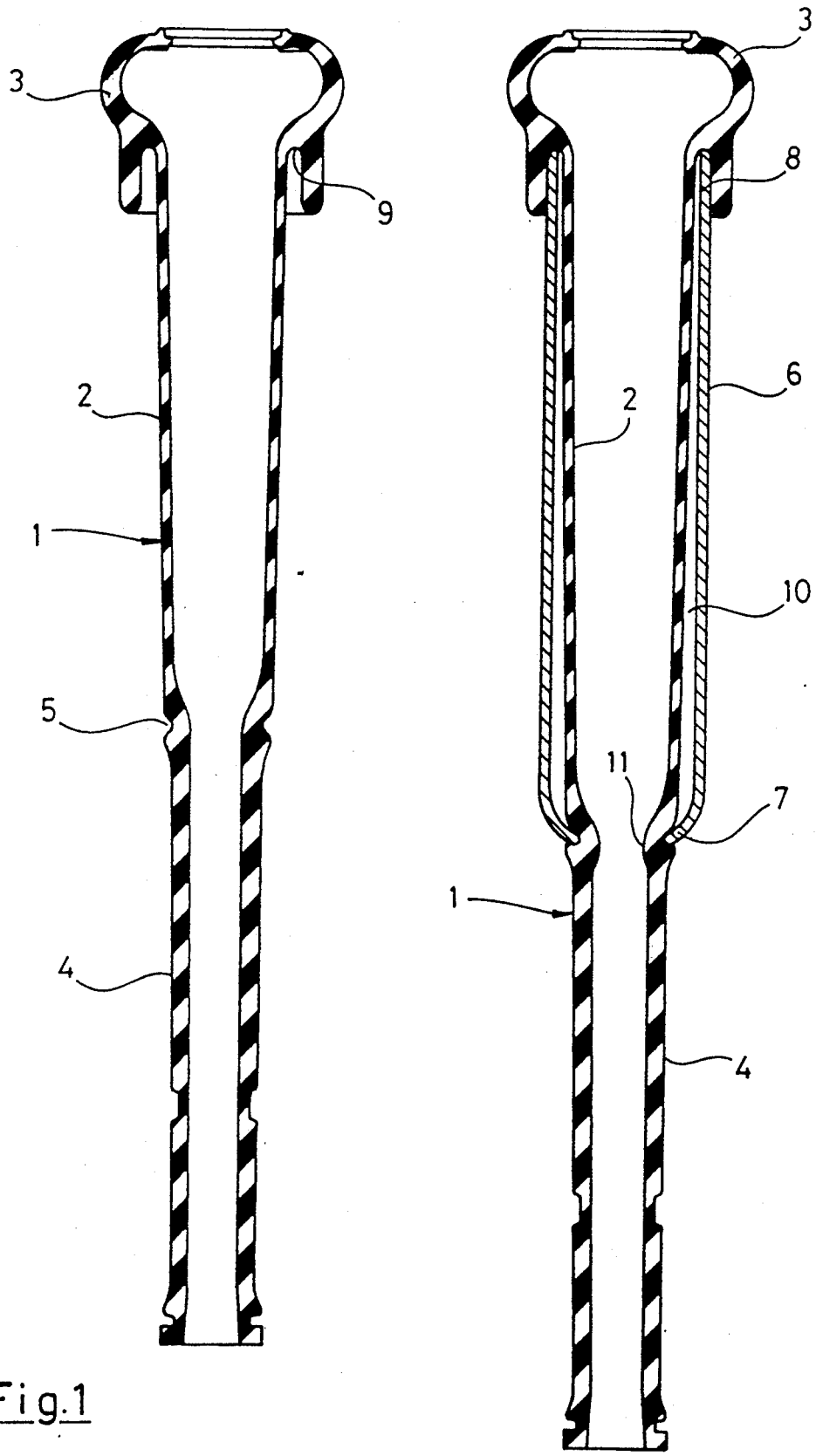

United States Patent [19]

Petterson et al.

[11] Patent Number: 5,215,036
[45] Date of Patent: Jun. 1, 1993

[54] TEAT CUP LINER

[75] Inventors: Torbjörn Petterson, Gnesta; Hans Flodin, Tullinge, both of Sweden

[73] Assignee: Alfa-Laval Agriculture International AB, Tumba, Sweden

[21] Appl. No.: 927,659

[22] PCT Filed: Dec. 5, 1991

[86] PCT No.: PCT/SE91/00834

§ 371 Date: Aug. 31, 1992

§ 102(e) Date: Aug. 31, 1992

[87] PCT Pub. No.: WO92/10928

PCT Pub. Date: Jul. 9, 1992

[30] Foreign Application Priority Data

Dec. 17, 1990 [SE] Sweden ............................ 9004024

[51] Int. Cl.⁵ .................................................. A01J 5/04
[52] U.S. Cl. ..................................................... 119/14.47
[58] Field of Search ..... 119/14.01, 14.02, 14.47–14.53

[56] References Cited

U.S. PATENT DOCUMENTS

| | | |
|---|---|---|
| 1,955,810 | 6/1932 | Hodsdon . |
| 2,744,496 | 5/1956 | Roben ............................ 119/14.47 |
| 4,141,319 | 2/1979 | Maier et al. .................... 119/14.47 |
| 4,425,872 | 1/1984 | Mills ................................ 119/14.47 |
| 4,572,106 | 2/1986 | Mills ................................ 119/14.47 |

FOREIGN PATENT DOCUMENTS

| | | |
|---|---|---|
| 0088580 | 1/1983 | European Pat. Off. . |
| 63885 | 4/1926 | Fed. Rep. of Germany . |
| 1138578 | 10/1962 | Fed. Rep. of Germany . |
| 2800733 | 9/1978 | Fed. Rep. of Germany . |
| 2151894 | 7/1985 | United Kingdom . |

Primary Examiner—Gene Mancene
Assistant Examiner—Thomas Price
Attorney, Agent, or Firm—Hovey, Williams, Timmons & Collins

[57] ABSTRACT

A teat cup liner (12) conventionally has a rotationally symmetrical tubular thick walled shaft portion (15), which has an outer annular groove (16) for receiving an annular end of a shape permanent rotationally symmetrical tubular teat cup 6), on which the teat cup liner is to be mounted, so that the teat cup liner is stretched by the teat cup. According to the invention the tubular shaft portion (15) is provided with an inner annular groove (17) situated close to the outer groove (16) of the shaft portion, but axially displaced relative to the outer groove in direction toward the free end of the shaft portion. The inner groove (17) counteracts the formation of an inner bulging of the shaft portion in front of the outer groove (16), when the teat cup liner is mounted on the teat cup (6).

4 Claims, 3 Drawing Sheets

TEAT CUP LINER

The present invention relates to a teat cup liner, comprising a tubular thin walled pulsation portion having two ends, a tubular radially enlarged head portion extending from one end of the pulsation portion, and a rotationally symmetrical tubular thick walled shaft portion extending from the other end of the pulsation portion. The shaft portion has an outer annular groove for receiving an annular end of a shape permanent, rotationally symmetrical tubular teat cup, on which the teat cup liner is to be mounted with the teat cup abutting against the head portion, so that the pulsation portion is axially stretched.

In order to provide a firm enggement between a teat cup liner of this kind and the teat cup, as the teat cup liner is mounted on the teat cup, the otuer groove of the shaft portion is dimensioned with a somewhat larger inner diameter than that of said annular end of the teat cup. Said firm engagement is necessary to fix the teat cup liner in a stretched state and to seal between the liner and the teat cup. In spite of the fact that the shaft portion is thick walled to avoid undesired deformations of the shaft portion it has been proved that the inner surface of the shaft portion gets an annular bulging at the other groove, when the teat cup liner is mounted in the teat cup. When using the teat cup liner during milking said bulging throttles the milk flow through the shaft portion, which often may lead to disturbances in the intended milking process.

Said bulging on the shaft portion can also result in that the liner will not fulfil some authorities' restrictive standards for the smallest allowable flow through area in the interior of the shaft portion.

The inner diameter of the shaft portion could certainly be made larger, so that also the diameter of the bulging would be increased, in order to counteract throttling of the milk flow. However, in such a case also the outer diameter of the shaft portion has to be increased to maintain the wall thickness of the shaft portion. In consequence, an entirely new expensive forming tool would be required. The teat cups of existing milking equipments would not fit to such larger teat cup liners, but would have to be replaced by new ones. In addition to this, an increased otuer diameter of the shaft portion would deteriorate the flexility of the shaft portion.

As an alternative, the core of the existing forming tool could be somewhat modified, so that a compensating inner annular groove is formed on the inside of the shaft portion axially on a level with the outer annular groove. Such an inner groove adequately formed should be able to prevent a bulging of the inner surface of the shaft portion as the teat cup liner is mounted in the teat cup. However, such an inner compensating groove to an unallowable extent would reduce the wall thickness of the shaft portion between the outer and inner grooves, so that the strength of the shaft portion would not be satisfactory.

The object of the present invention is to provide an improved teat cup liner, which fits to the existing type of teat cups and maintains the intended hole diameter along the entire shaft portion, as the teat cup liner is mounted on the teat cup, without requiring an entirely new forming tool and without deteriorating the strength of the shaft portion.

This object is obtained by a teat cup liner of the kind initially described, which mainly is characterized in that the tubular shaft portion is provided with an inner annular groove, which is situated close to the outer groove of the shaft portion, but axially displaced relative to the outer groove in direction from the pulsation portion.

As a result, it has surprisingly been proved that said inner groove counteracts the formation of the annular bulging on the inner surface of the shaft portion, as the teat cup liner is mounted on the teat cup. The axial state of strain arisen in the pulsation portion of a mounted teat cup liner apparently results in such a shearing of the wall of the shaft portion at the area of the engagement of the teat cup with the shaft portion that the annular bulging on the inner surface of the shaft portion in fact is formed somewhat axially displaced relative to the outer groove, with reference to an unmounted teat cup liner. Thus, since the inner annular groove is not situated axially on a level with the outer annular groove, but is axially displaced relative to the outer groove, the wall thickness of the shaft portion is not reduced to an unallowable extent at the grooves. In addition, the advantage is obtained that only the core of the existing forming tool needs to be remade, whereby the existing forming tool with a new core can be used to produce the teat cup liner according to the invention.

The inner groove is sutiable axially displaced along the shaft portion at least 2 mm and at most 4 mm relative to the outer groove.

Figure 3:
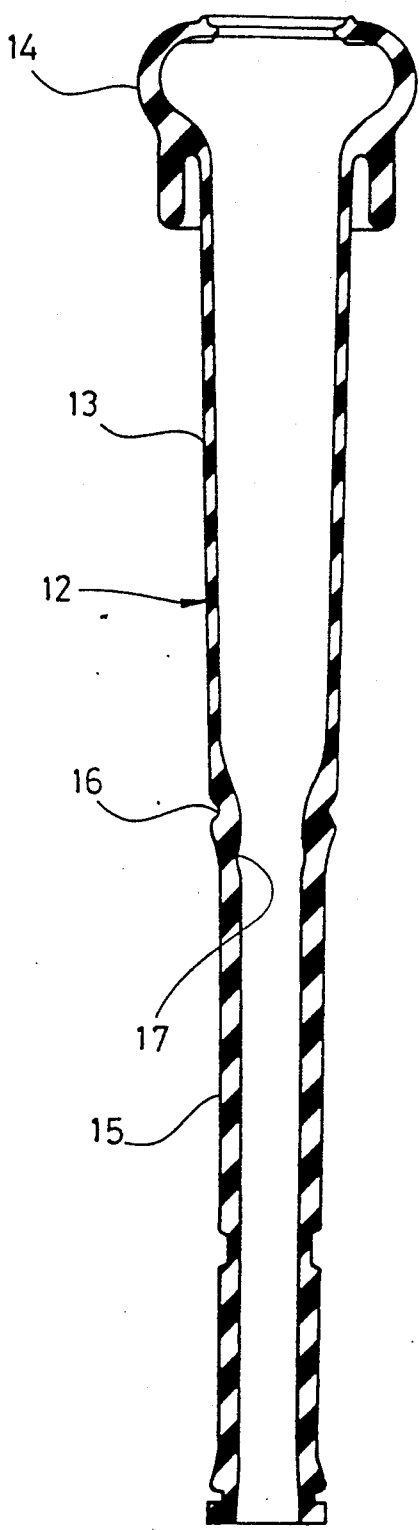
Figure 4:
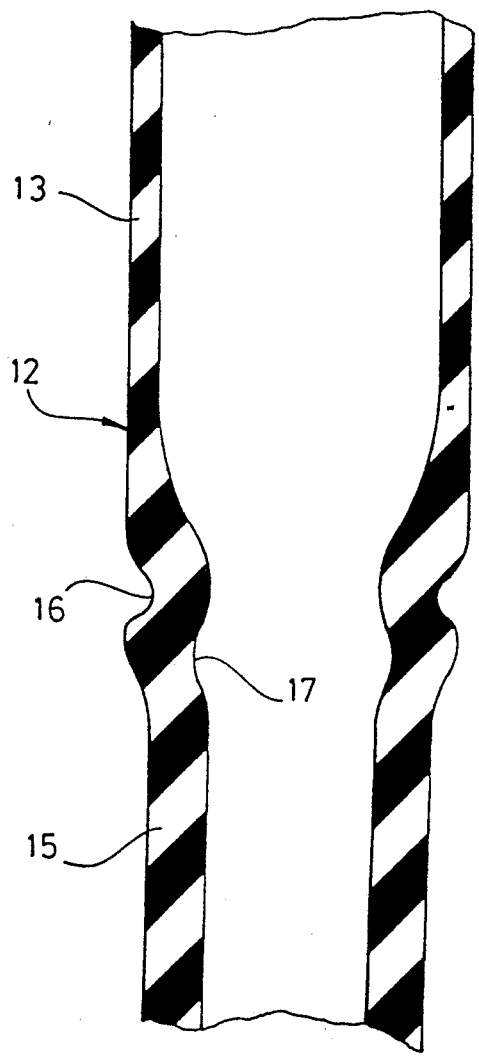
Figure 5:
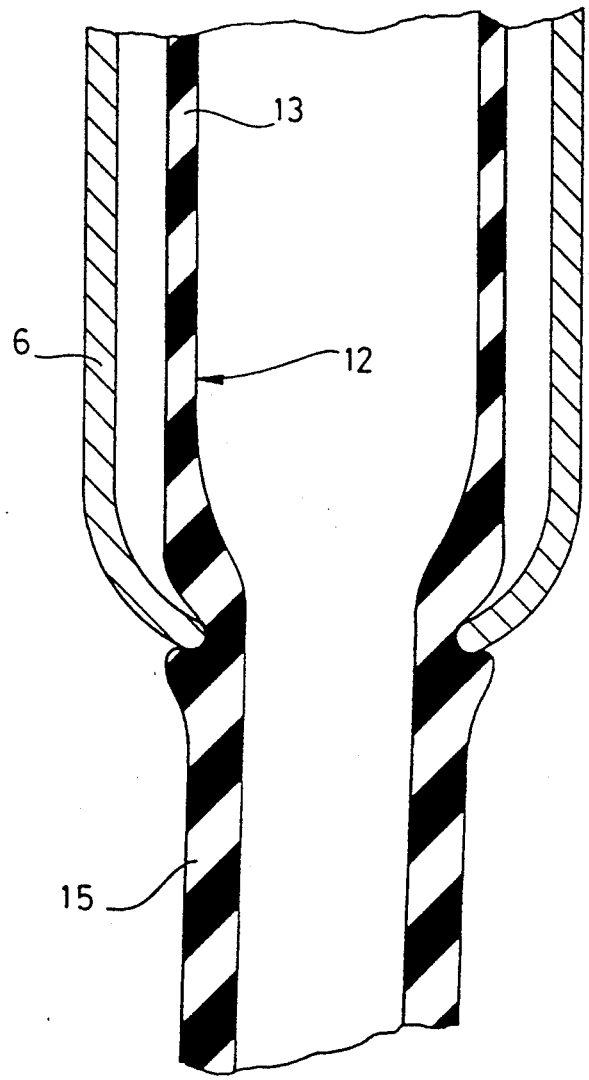

The invention is described more closely in the following with reference to the accompanying drawings, in which FIG. 1 shows a conventional teat cup liner, FIg. 2 shows the teat cup liner according to FIG. 1 mounted in a teat cup, FIG. 3 shows the teat cup liner according to the invention, FIG. 4 shows a detail of the teat cup liner in FIG. 3, and FIG. 5 shows the same detail as FIG. 4, but with the teat cup liner mounted in a teat cup.

The conventional teat cup liner 1 shown in FIG. 1 has a tubular pulsation portion 2 with a wall thickness of about 2 mm, a tubular radially enlarged head portion 3 extending from the upper end of the pulsation portion 2, as shown in the drawing, and a rotationally symmetrical tubular shaft portion 4 extending from the lower end of the pulsation portion 2. In the vicinity of the pulsation portion 3, the shaft portion 4 has a wall thickenss of about 5 mm and an outer annular groove 5, which has a bottom radius of about 2 mm, as seen in an axial plane through the shaft portion 4.

In FIG. 2 there is shown the teat cup liner 1 mounted on a tubular teat cup 6 with a circular cross-section, an annular end 7 of the teat cup 6 engaging with the shaft portion 4 in the groove 5, while the other end 8 of the teat cup 6 abuts against a shoulder 9 of the head portion 3. Since the teat cup 6 is longer than the distance between the shoulder 9 and the groove 5, the pulsation portion 2 is stretched axially. Between the teat cup 6 and the stretched pulsation portion 2, a pulsation space 10 is formed, which is to be subjected to a pulsation pressure during milking to open and close the interior of the teat cup liner 1.

The annular end 7 of the teat cup 6 has an inner diameter which is bout 20 mm, whereas the groove 5 of the teat cup liner 1, when the liner 1 is unmounted, has an inner diameter which is about 22.5 mm. (Known teat cups and teat cup liners fitting thereto are generally dimensioned, such that the outer annular groove has an inner diameter which is at least 10% larger than the inner diameter of said annular end of the teat cup). Thus, the shaft portion 4 is compressed radially at the groove 5, when the teat cup liner 1 is mounted on the teat cup 6. This results in that the inner surface of the shaft portion 4 gets an annular bulging 11 at the annular end 7 of the teat cup 6. During milking the milk flow through the interior of the shaft portion 4 is throttled by the bulging 11.

The teat cup liner 12 according to the invention shown in FIG. 3 has a design similar to the teat cup liner according to FIG. 1 and thus has a pulsation portion 13, a head portion 14, and a rotationally symmetrical shaft portion 15 with an outer annular groove 16. In addition to this the shaft portion 15 is formed with an inner annular groove 17 situated about 3 mm axially displaced relative to the outer groove 16 of the shaft portion 15 in direction from the pulsation portion 13 of the teat cup liner 12. In an axial plane through the teat cup liner 12, the outer groove 16 has a bottom radius which is about 2.5 mm, whereas the inner groove 17 has a bottom radius which is about 30 mm. The depth of the inner groove 17 is about 0.6 mm.

As the teat cup liner 12 is mounted on a teat cup 6 of the same kind as shown in FIG. 2, the shaft portion 15 is compressed at the the grooves 16 and 17 resulting in that the inner groove 17 disappears, so that the inner surface of the shaft portion 15 gets completely smooth (FIG. 5).

Test results have shown that the inner groove 17 should be axially displaced at least 2 mm and at most 4 mm relative to the outer groove 16, and the depth of the inner groove 17 should be at least 0.4 mm, in order to coutneract the formation of an inner bulging of the shaft portion 15. Of course, the inner groove 17 should not have a larger depth than necessary, in order to avoid a deterioration of the resistance of the shaft portion 15 against flattening, when milking vacuum prevails in the interior of the shaft portion 15. In addition, an unnecessary large depth of the inner groove 17 might result in a remaining inner groove of the teat cup linear, when the liner is mounted on the teat cup, which could lead to disturbances in the milk flow through the shaft portion 15 during milking. Seen in an axial plane thorough the shaft portion 15 the inner groove 17 should have a bottom radius which is at least ten and at most fifteen times larger than the corresponding bottom radius of the outer groove 16.

We claim:

1. A teat cup liner, comprising a tubular thin walled pulsation portion (13) having two ends, a tubular radially enlarged head portion (14) extending form one end of the pulsation portion, and a rotationally symmetrical tubular thick walled shaft portion (15) extending from the other end of the pulsation portion and having an outer annular groove (16) for receiving an annular end of a shape permanent rotationally symmetrical tubular teat cup (6), on which the teat cup liner is to be mounted with the teat cup abutting against the head portion, so that the pulsation portion is axially stretched, characterized in that the tubular shaft portion (15) is provided with an inner annular groove (17) situated close to the outer groove (16) of the shaft portion, but axially displaced relative to the outer groove in direction from the pulsation portion (13).

2. A teat cup liner according to claim 1, characterized in that the inner groove (17) is axially displaced at least 2 mm and at most 4 mm relative to the outer groove (16).

3. A teat cup liner according to claim 2, characterized in that in an axial plane through the shaft portion (15), the inenr groove (17) has a bottom radius which is at least ten and at most fifteen times larger than the corresponding bottom radius of the outer groove (16).

4. A teat cup liner according to claim 3, in which the outer annular groove (16) has an inner diameter which is at least 1 mm larger than the inner diameter of said annular end of said teat cup (6), haracterized in that in an axial plane through the shaft portion (15), the inenr groove (17) has a depth which is at least 0.4 mm.

* * * * *